United States Patent
Yamazaki (10) Patent No.: US 11,079,500 B2
(45) Date of Patent: Aug. 3, 2021

(54) RADIATION IMAGING APPARATUS AND CONTROL METHOD THEREOF

(71) Applicant: CANON KABUSHIKI KAISHA, Tokyo (JP)

(72) Inventor: Takashi Yamazaki, Tsurugashima (JP)

(73) Assignee: CANON KABUSHIKI KAISHA, Tokyo (JP)

(*) Notice: Subject to any disclaimer, the term of this patent is extended or adjusted under 35 U.S.C. 154(b) by 540 days.

(21) Appl. No.: 15/936,681

(22) Filed: Mar. 27, 2018

(65) Prior Publication Data
US 2018/0284301 A1  Oct. 4, 2018

(30) Foreign Application Priority Data

Apr. 3, 2017 (JP) .............. JP2017-074027

(51) Int. Cl.
| | | |
|---|---|---|
| *G01T 1/24* | (2006.01) | |
| *H04N 5/232* | (2006.01) | |
| *H04N 5/32* | (2006.01) | |
| *H04N 5/361* | (2011.01) | |
| *H04N 5/357* | (2011.01) | |

(52) U.S. Cl.
CPC .............. *G01T 1/244* (2013.01); *G01T 1/247* (2013.01); *H04N 5/23241* (2013.01); *H04N 5/32* (2013.01); *H04N 5/357* (2013.01); *H04N 5/361* (2013.01)

(58) Field of Classification Search
CPC .......... H04N 5/361; G01T 1/244; G01T 1/247
See application file for complete search history.

(56) References Cited

U.S. PATENT DOCUMENTS

| | | | |
|---|---|---|---|
| 5,877,501 A * | 3/1999 | Ivan et al. | |
| 7,866,163 B2 | 1/2011 | Ertel | |
| 9,482,628 B2 | 11/2016 | Naito et al. | |
| 9,756,267 B2 | 9/2017 | Dowaki et al. | |
| 9,838,619 B2 | 12/2017 | Yamazaki et al. | |
| 2005/0195296 A1* | 9/2005 | Compton et al. | |
| 2006/0070384 A1* | 4/2006 | Ertel | |
| 2007/0291900 A1* | 12/2007 | Hahm et al. | |
| 2010/0019720 A1* | 1/2010 | Liu et al. | |
| 2014/0107466 A1* | 4/2014 | Song et al. | |

FOREIGN PATENT DOCUMENTS

| | | | |
|---|---|---|---|
| JP | 2002-248095 A | 9/2002 | |
| JP | 2006075359 A | 3/2006 | |
| JP | 2006-102492 A | 4/2006 | |
| JP | 2010029419 A | 2/2010 | |
| JP | 2010-259577 A | 11/2010 | |
| JP | 2011101693 A | 5/2011 | |
| JP | 4744831 A | 8/2011 | |

* cited by examiner

Primary Examiner — Yara B Green
(74) Attorney, Agent, or Firm — Venable LLP (57) ABSTRACT

A radiation imaging apparatus that generates an image by receiving radiation transmitted through an object, comprises a sensor array configured to detect radiation, an obtaining unit configured to obtain an image signal from a detection signal of the sensor array, a power reception unit configured to receive power supplied from outside, and battery that is charged by using the power received by the power reception unit. The radiation imaging apparatus generates, in response to the satisfaction of a predetermined condition after power reception is started by the power reception unit, an image for correction by obtaining the image signal from the obtaining unit.

17 Claims, 7 Drawing Sheets

RADIATION IMAGING APPARATUS AND CONTROL METHOD THEREOF

BACKGROUND OF THE INVENTION

Field of the Invention

The present invention relates to a radiation imaging apparatus that captures a radiation image and a control method thereof.

Description of the Related Art

There is a radiation imaging apparatus that generates a sharp radiation image by performing image processing on an image obtained by digitizing an intensity distribution of radiation emitted from a radiation generating apparatus and transmitted through an object. In such a radiation imaging apparatus, there is developed a radiation imaging apparatus that can be driven by a battery and is made to be portable by adding a wireless communication function. Japanese Patent Laid-Open No. 2002-248095 (literature 1) proposes a docking station that, in addition to storing and charging a portable radiation imaging apparatus, can transfer an image from a radiation imaging apparatus. Japanese Patent Laid-Open No. 2006-102492 (literature 2) and Japanese Patent Laid-Open No. 2010-259577 (literature 3) propose a method of reducing a temperature stabilization time from the removal of a radiation imaging apparatus from the docking station until the apparatus is subsequently used.

Generally, in a radiation imaging apparatus, a flat panel detector (FPD) is used as a sensor array. In each imaging element of the FPD, fixed pattern noise is generated due to a dark current component in a pixel or variations in the amplification transistors forming the pixels. Various kinds of methods have been proposed as the method of suppressing this fixed pattern noise. In Japanese Patent No. 4744831 (literature 4), a plurality of sets of dark current image data are obtained during a non-imaging period before the start of radiation imaging of an object, and the obtained plurality of sets of dark current image data are combined to generate offset correction data. In literature 4, the fixed pattern noise is removed from a radiation image by using the offset correction data generated in this manner.

However, the techniques disclosed in literatures 1 to 4 do not consider the timing of the obtainment of the image for offset correction which is performed ahead of the imaging by the radiation imaging apparatus. Note that since this image for offset correction is used in a fixed manner in imaging, it is also referred to as an image for fixed offset correction. In general, the obtainment timing of an image for fixed offset correction is not considered for a case in which imaging is to be performed by removing the radiation imaging apparatus from the docking station that serves as a holder.

SUMMARY OF THE INVENTION

An embodiment of the present invention provides a radiation imaging apparatus that can suitably execute obtainment of an image for offset correction so that imaging can start smoothly when the radiation imaging apparatus is removed from a holder.

According to one aspect of the present invention, there is provided a radiation imaging apparatus that generates an image by receiving radiation transmitted through an object, comprising: a sensor array configured to detect radiation; an obtaining unit configured to obtain an image signal from a detection signal of the sensor array; a power reception unit configured to receive power supplied from outside; a battery that is charged by using the power received by the power reception unit; and a generating unit configured to generate, in response to the satisfaction of a predetermined condition after power reception is started by the power reception unit, an image for correction by obtaining the image signal from the obtaining unit.

According to another aspect of the present invention, there is provided a control method of a radiation imaging apparatus that includes a sensor array configured to detect radiation and generates an image by receiving the radiation transmitted through an object, the method comprising: receiving power supplied from outside; charging a battery using the received power; and generating an image for correction by obtaining an image from the sensor array in response to the satisfaction of a predetermined condition after power reception is started in the receiving.

Further features of the present invention will become apparent from the following description of exemplary embodiments (with reference to the attached drawings).

DESCRIPTION OF THE EMBODIMENTS

Embodiments of the present invention will be described below with reference to accompanying drawings.

First Embodiment

Figure 1:
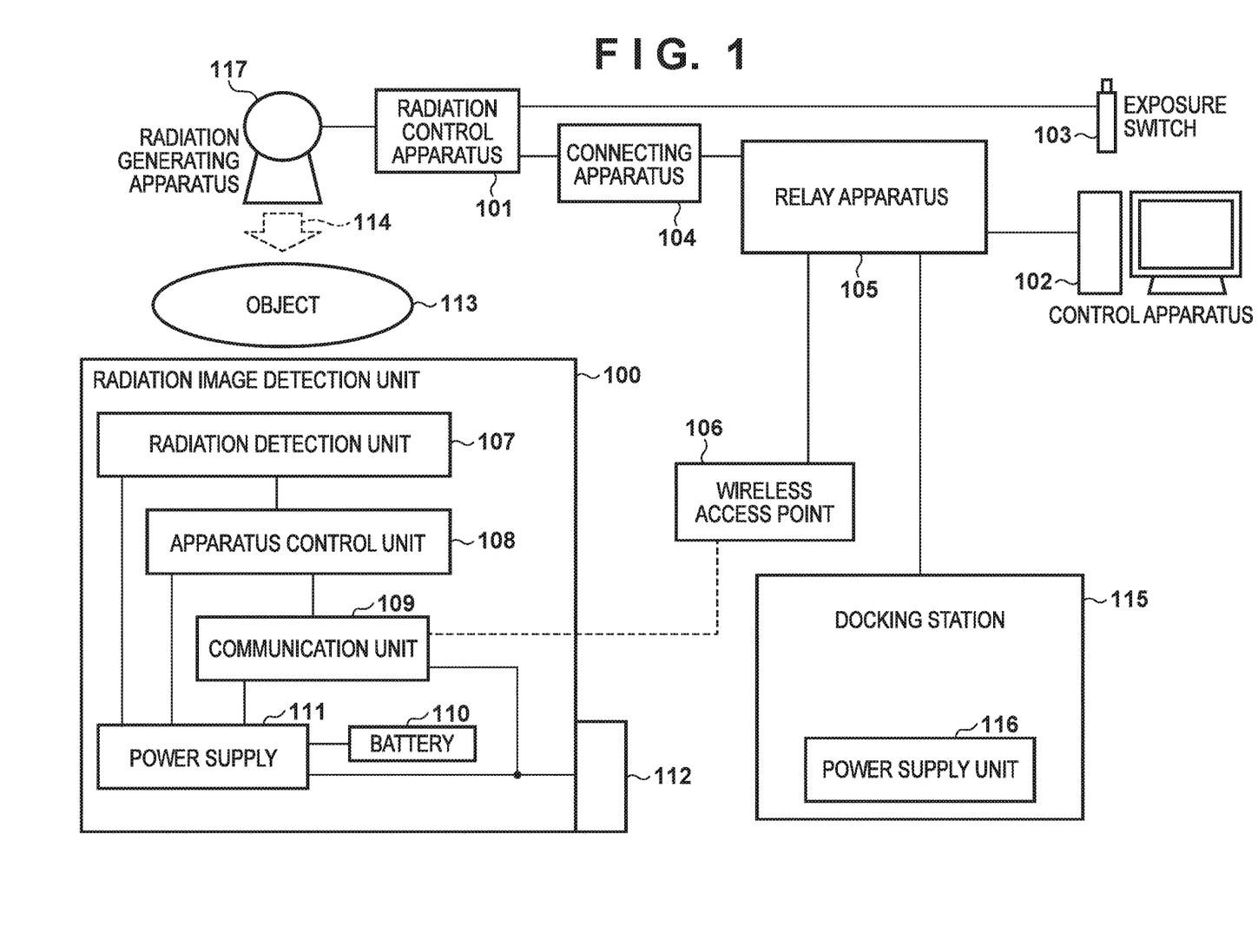
FIG. 1 is a block diagram showing an example of the arrangement of a radiation imaging system according to the first embodiment.

FIG. 1 is a block diagram showing an example of the arrangement of a radiation imaging system using a radiation image detection unit 100 according to the first embodiment. The radiation imaging system includes a radiation image detection unit 100 serving as a radiation imaging apparatus, a radiation control apparatus 101, a radiation generating apparatus 117, a connecting apparatus 104, an exposure switch 103, a relay apparatus 105, a control apparatus 102, and a docking station 115. The radiation image detection unit 100 generates an image by receiving radiation 114 transmitted through an object 113. The radiation control apparatus 101 communicates with the radiation image detection unit 100 via a connecting apparatus 104 and the relay apparatus 105 that mediate the communication. When the exposure switch 103 is pressed, the radiation control apparatus 101 exchanges, with the radiation image detection unit 100, control signals that include an imaging synchronization signal used to emit the radiation 114 from the radiation generating apparatus 117 and perform imaging by the radiation image detection unit 100. The radiation 114 generated by the radiation generating apparatus 117 is transmitted through the object 113, and the radiation image detection unit 100 is irradiated with the radiation. The radiation image detection unit 100 captures, as a radiation image, the intensity distribution of the radiation 114 which is attenuated as it is transmitted through the object 113. The radiation image obtained by the radiation image detection unit 100 is transmitted to the control apparatus 102 via the relay apparatus 105 and displayed on a display device by the control apparatus 102.

It is possible to select, as the connection between the radiation image detection unit 100 and the relay apparatus 105, a wired connection via a wired connector 112 and a wireless connection via a wireless access point 106. In the case of a wireless connection, the power consumed by the radiation image detection unit 100 is supplied from a battery 110 in the radiation image detection unit 100.

Also, the radiation image detection unit 100 includes a radiation detection unit 107, an apparatus control unit 108, a communication unit 109, the battery 110, and a power supply 111. When the wired connector 112 is connected, the power supply 111 supplies power to the radiation detection unit 107, the apparatus control unit 108, and the communication unit 109 by receiving and converting the voltage of a DC power supply that has been converted from a commercial power supply by the relay apparatus 105. The power supply 111 charges, as needed, the battery 110 by using power from a commercial power supply supplied from the wired connector 112. That is, in this embodiment, the wired connector 112 functions as a power reception unit that receives power supplied from the outside. The battery 110 is charged by using the power received by the power reception unit. That is, the power supply 111 has a function as a charging unit that performs charging by using the power received by the power reception unit. Note that although the embodiment has shown the wired connector 112 that performs wired power reception as a power reception unit, the embodiment is not limited to this. For example, a wireless power reception form (wireless power transmission) may be used. Also, in a case in which the wired connector 112 is not connected, the power supply 111 has a function of supplying power to the radiation detection unit 107, the apparatus control unit 108, and the communication unit 109 by converting the voltage supplied from the battery 110.

The radiation detection unit 107 has a function as an obtaining unit that obtains image signals from a sensor array that converts emitted radiation into charges in accordance with the radiation dose. The image signals obtained by the radiation detection unit 107 are transmitted as radiation image data to the apparatus control unit 108. At this time, the apparatus control unit 108 can have a function of performing offset correction, gain correction, and loss correction and can perform signal/image processing on the radiation image data transmitted from the radiation detection unit 107.

The apparatus control unit 108 uses the communication unit 109 to transmit the radiation image data to the relay apparatus 105. When the wired connector 112 is connected, the radiation image data is transmitted by wired communication. When the wired connector 112 is not connected, the radiation image data is transmitted by wireless communication via the wireless access point 106. The apparatus control unit 108 also has a function of a generating unit that generates an image for correction by obtaining the image signals by the obtaining unit function of the radiation detection unit 107 in response to the satisfaction of a predetermined condition after power reception is started by the wired connector 112 which serves as the power reception unit. Details of the obtaining unit of the radiation detection unit 107 will be described later with reference to FIG. 2. The predetermined condition for starting the generation of an image for correction will be described in detail with reference to the flowchart of FIG. 5.

The docking station 115 is a holder (for example, a cradle) that holds the radiation image detection unit 100. The wired connector 112 that functions as the power reception unit receives power from a power supply unit 116 of the docking station 115 that serves as the holder, and the battery 110 is charged by using the power received by the power reception unit. That is, while the radiation image detection unit 100 is held in the docking station 115, the wired connector 112 and the power supply unit 116 are connected, and the radiation image detection unit 100 (the battery 110) is charged. The power supply unit 116 supplies the necessary voltage to the radiation image detection unit 100. Note that the arrangement for the voltage supply by the docking station 115 can be, for example, an arrangement that generates the voltage to be supplied by performing AC/DC conversion from the commercial power supply or an arrangement via DC voltage by the relay apparatus. The docking station 115 is connected to the control apparatus 102 via the relay apparatus 105. The control apparatus 102 can set the radiation image detection unit 100 held in the docking station 115 and transfer image data through the wired connector 112. Note that it is sufficient for the docking station 115 to be able to supply power via the wired connector 112 at least, and the docking station need not have a form that can hold the radiation image detection unit 100.

Note that the arrangement shown in FIG. 1 is an example, and the devices that may be connected to use the radiation image detection unit 100 need not be limited to those shown in FIG. 1, as a matter of course. Also, the connection order of the devices is not limited to that shown in FIG. 1. The method is not limited for the correction processing which is to be performed on the obtained radiation image, either. Depending on the system, irradiation permission (imaging synchronization signal) to the radiation image detection unit 100 is not required.

Figure 2:
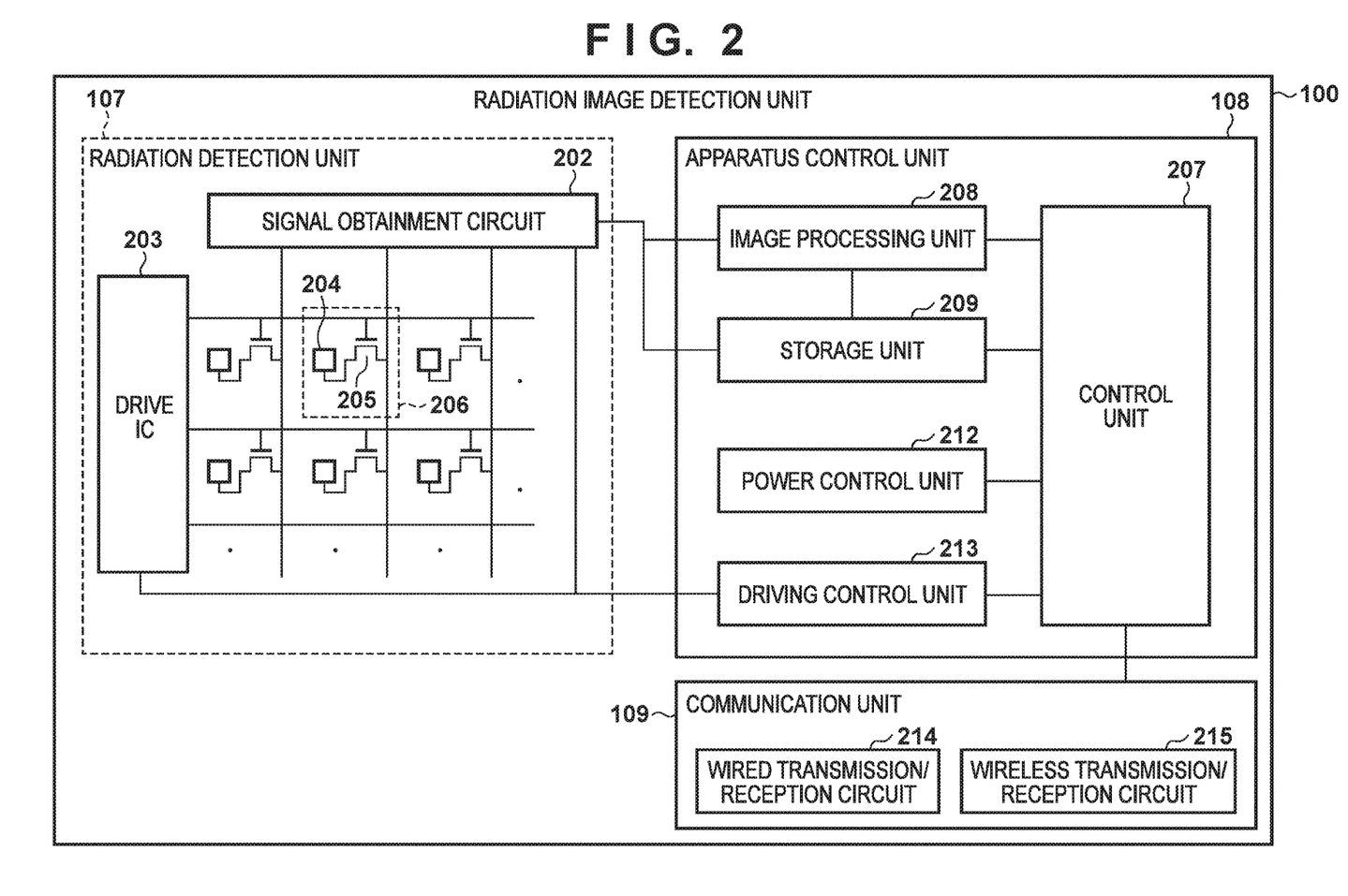
FIG. 2 is a block diagram showing an example of the arrangement of a radiation image detection unit according to the first embodiment.

FIG. 2 shows an example of the hardware arrangement of the radiation detection unit 107, the apparatus control unit 108, and the communication unit 109 to be provided in the radiation image detection unit 100.

The radiation detection unit 107 includes a drive IC 203 and a plurality of pixels 206 each formed by a photoelectric conversion element 204 and a switch element 205. The number of pixels 206 is the pixel count of the radiation image detection unit 100. The pixels 206 are arranged in a matrix to form a sensor array for detecting radiation. The radiation detection unit 107 includes a signal obtainment circuit 202 that is provided with an amplification IC which amplifies signals from the sensor array and an ADC (Analog Digital Converter) which converts analog signals into digital signals. The drive IC 203 selects and drives a row wiring line (line) in the sensor array and turns on the switch element 205 of each pixel 206 connected to the selected row wiring line.

The signal obtainment circuit 202 and the drive IC 203 are an example of an obtaining unit that reads out detection signals from the sensor array to obtain image signals. This operation will be described hereinafter. An image signal (charges) accumulated in the photoelectric conversion element 204 is output to a corresponding column wiring line from each pixel 206 whose switch element 205 has been set to ON by the row wiring line driving operation of the drive IC 203. Each image signal output to the corresponding column wiring line of the sensor array is amplified by the signal obtainment circuit 202 and converted into digital data. The drive IC 203 sequentially selects each row wiring line under the control of the apparatus control unit 108, and image data (radiation image) is obtained by the signal obtainment circuit 202 by digitizing each image signal output to the corresponding column wiring line.

Each pixel 206 also includes charges (to be referred to as dark charges hereinafter) that are generated without radiation irradiation. The dark charges cause uneven artifacts to be generated in an image by being superimposed on signal charges generated by radiation irradiation. Offset correction performed to reduce these artifacts will be described later. Also, the dark charges can change in magnitude depending on the temperature. Hence, temperature changes in the radiation detection unit 107 will make the correction of artifacts that were caused by the dark charges more difficult. From the above-described reasons, it is desirable for the temperature of the radiation detection unit 107 to be constant.

The apparatus control unit 108 includes a control unit 207, an image processing unit 208, a storage unit 209, a power control unit 212, and a driving control unit 213. The control unit 207 is a unit that performs processing related to the control of each unit in the radiation image detection unit 100 and is formed from, for example, a CPU or the like.

The image processing unit 208 performs image processing such as gain processing and offset correction processing (to be described later) on the image data output from the signal obtainment circuit 202. The image processing unit 208 performs other basic image processing operations such as offset correction, gain correction, and loss correction processing operations to obtain low-noise radiation image data. Note that the image processing unit 208 may be provided outside the radiation image detection unit 100, for example, in the control apparatus 102, and in this case, information necessary for the aforementioned correction processes is transmitted from the radiation image detection unit 100 to the control apparatus 102.

The storage unit 209 stores image data output from the signal obtainment circuit 202 or the image processing unit 208, image data for correction processing (an image for offset correction, gain correction data, loss information, and the like) of the image processing unit 208, and the like. Note that the storage unit 209 does not have any particular constraints in implementation and can be implemented by various combinations of one or a plurality of memories, HDDs, volatile memories, and nonvolatile memories.

The communication unit 109 includes a wired transmission/reception circuit 214 and a wireless transmission/reception circuit 215. The wired transmission/reception circuit 214 performs wired transmission of image data processed by the image processing unit 208 to the external control apparatus 102 or the like via the wired connector 112. The wireless transmission/reception circuit 215 includes an amplifier and an antenna for wireless transmission/reception, and performs wireless transmission of the image data processed by the image processing unit 208 to the external control apparatus 102 or the like.

The power control unit 212 controls the power supply 111 of the radiation image detection unit 100. The power control unit 212 performs control so that the power supply 111 can generate various kinds of power necessary for the operation of the radiation image detection unit 100 by receiving power supply from the battery 110 or the wired connector 112 and supply the generated power to each unit. The power control unit 212 detects whether the power supply is from the wired connector 112 and transmits the detected power supply to the control unit 207. The power control unit 212 detects the remaining charge amount of the battery 110.

The driving control unit 213 controls the signal obtainment circuit 202 and the drive IC 203. The driving control unit 213 executes constant temperature drive to make the temperature constant in the radiation image detection unit 100 by repetitively driving the circuit of the obtaining unit regardless of the signal readout from the sensor array. More specifically, the temperature in the apparatus is constant by causing the signal obtainment circuit 202 to continuously perform analog/digital conversion, digital signal transmission, and the like even at a time other than the readout time of image signals accumulated in the photoelectric conversion elements 204. When the temperature in the radiation image detection unit 100 is constant by the constant temperature drive, even if the obtainment interval between an image obtained for offset correction and the radiation image which is to undergo the offset correction is increased, it is possible to perform correction while suppressing the influence of a dark-current change due to the temperature.

Figure 3:
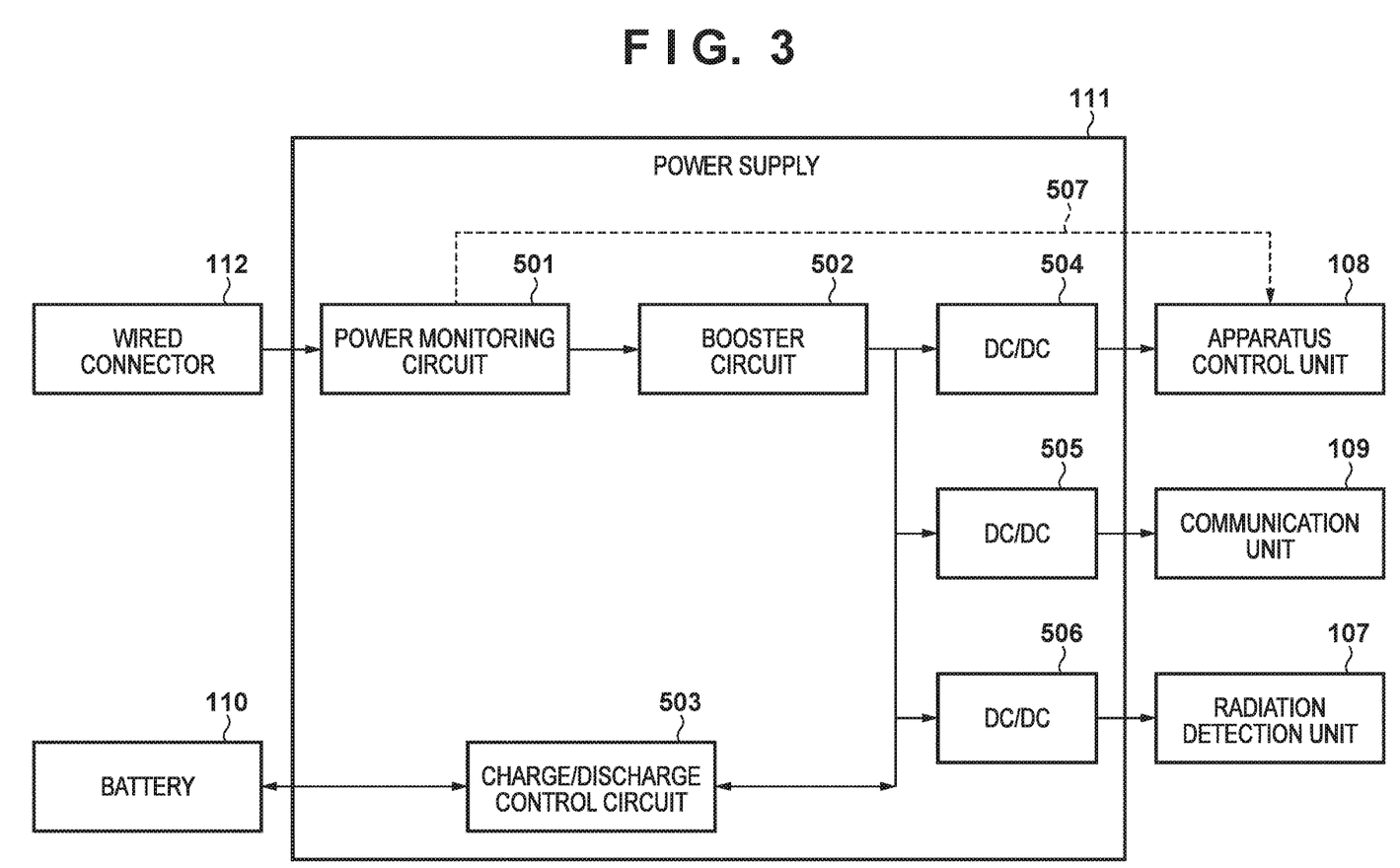
FIG. 3 is a block diagram showing an example of the arrangement of a power supply of the radiation image detection unit according to the first embodiment.

FIG. 3 is a block diagram of an example of the arrangement of the power supply 111 according to this embodiment. The power supply 111 includes a power monitoring circuit 501, a booster circuit 502, a charge/discharge control circuit 503, and DC/DC converters 504, 505, and 506. The power supplied from the outside to the radiation image detection unit 100 via the wired connector 112 is passed through the power monitoring circuit 501 and supplied to the booster circuit 502. The booster circuit 502 boosts the voltage of the supplied power to a desired voltage. The boosted voltage is further converted into necessary voltages in the DC/DC converters 504, 505, and 506 and the converted voltages are output to the apparatus control unit 108, communication unit 109, and the radiation detection unit 107, respectively. In a case in which the power control unit 212 determines that the battery charge is insufficient, the power control unit 212 controls the charge/discharge control circuit 503 and charges the battery 110. In a case in which the wired connector 112 is not connected and power supply from the outside is not supplied to the radiation image detection unit 100, the power control unit 212 controls the charge/discharge control circuit 503 so that the power accumulated in the battery 110 is supplied to the DC/DC converters 504, 505, and 506. The DC/DC converters 504, 505, and 506 supply necessary voltages of power supply to the apparatus control unit 108, the communication unit 109, and the radiation detection unit 107, respectively, in the same manner as that when receiving power supply from the outside. The power monitoring circuit 501 monitors whether power is being supplied from the outside and transmits a supply presence/absence signal 507 representing the monitoring result to the power control unit 212.

Figure 4:
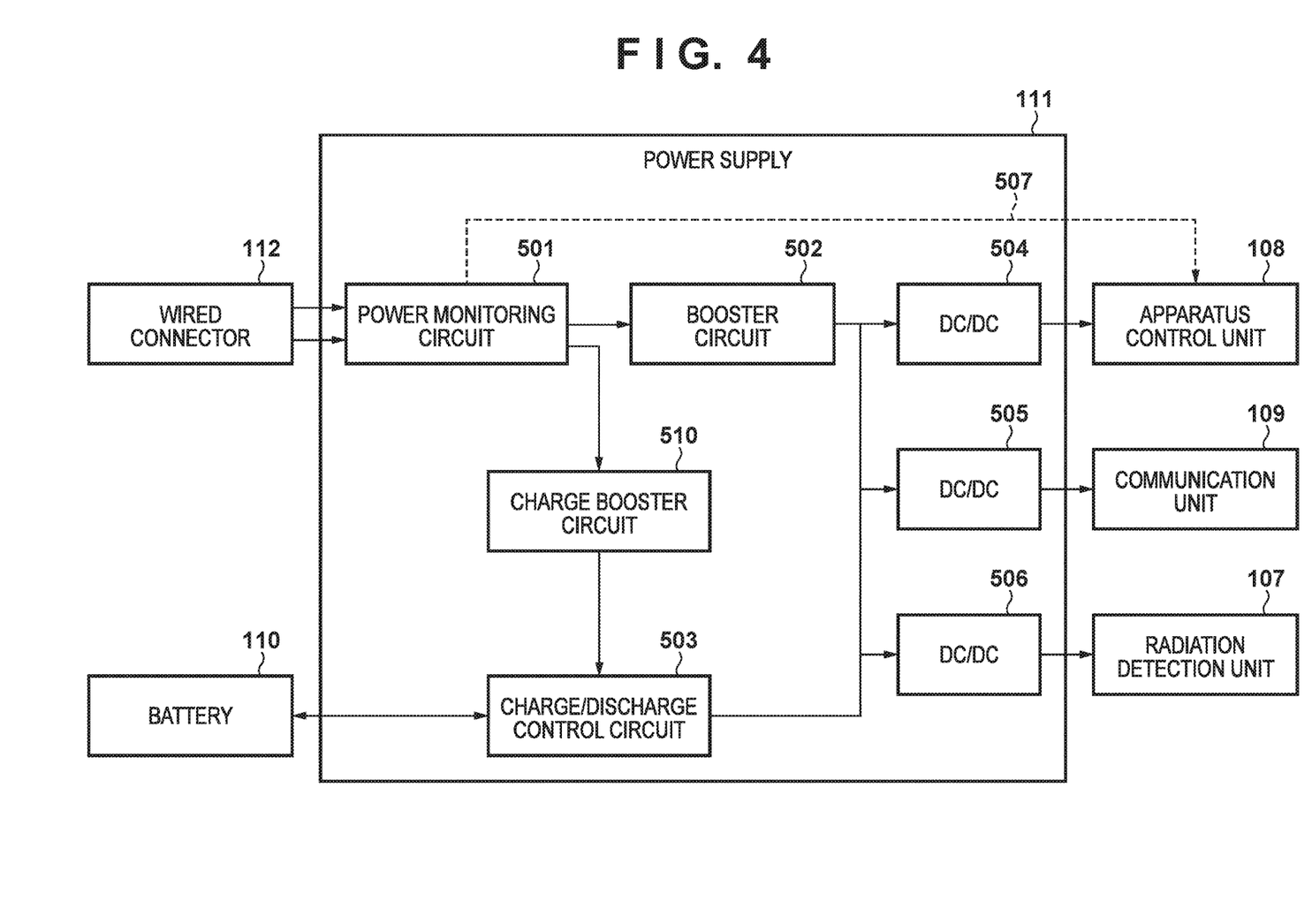
FIG. 4 is a block diagram showing an example of the power supply of the radiation image detection unit that has a plurality of power inputs.

Note that although there is only one power supply path from the wired connector 112 for the sake of descriptive convenience in the arrangement of FIG. 3, an arrangement that has a plurality of power supply paths such as that shown in FIG. 4 may be employed. By having a plurality of power supply paths, it is possible to separate the power supply path of the radiation detection unit 107, which is sensitive to changes in power supply voltage, and the power supply path of the charge/discharge control circuit 503, which controls the charge/discharge of large currents. FIG. 4 shows an example of the arrangement of the power supply 111 that has two power supply paths and to which a charge booster circuit 510 has been added. Of the two power supply paths, the first power supply is a power supply for charging the battery 110 and is supplied to the charge booster circuit 510 via the power monitoring circuit 501. The second power supply is supplied to the booster circuit 502 via the power monitoring circuit 501 and supplied to each unit including the radiation detection unit 107 (the sensor array, the obtaining unit, and the like). The charge/discharge control circuit 503 has a switching function so as to connect to the charge booster circuit 510 during a charging operation and to connect to the DC/DC converters 504, 505, and 506 during a discharging operation. Note that the power supply unit 116 of the docking station 115 will also have two power output terminals in accordance with this arrangement. This arrangement can reduce the influence to the radiation detection unit 107 caused by changes in the charge current. Although the DC/DC converters are used to supply power to each unit in FIGS. 3 and 4, it is possible to use a series regulator instead of the DC/DC converters.

Figure 5:
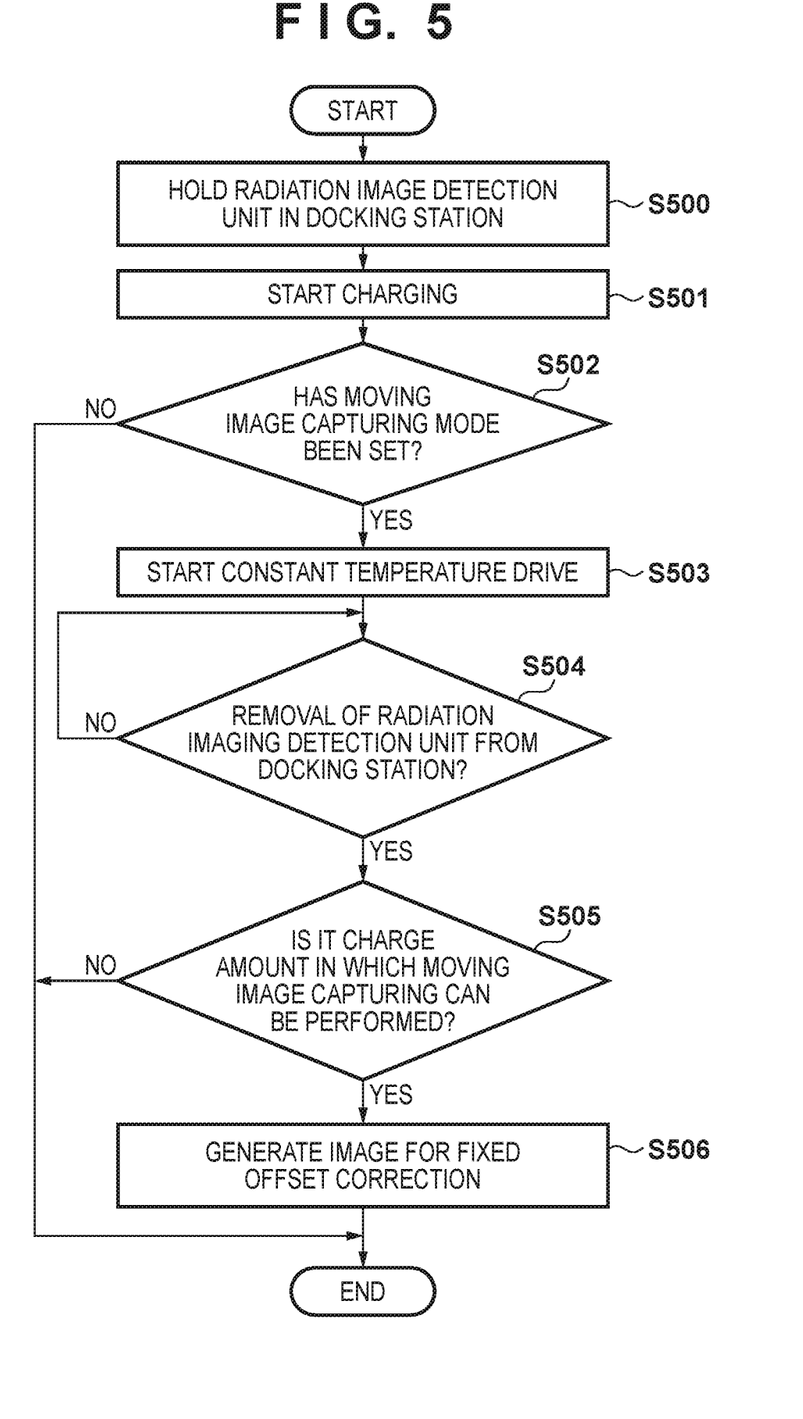
FIG. 5 is a flowchart showing obtainment processing of an image for correction according to the first embodiment.

Processing to be performed until the generation of an image for offset correction for moving image capturing when the radiation image detection unit 100 is held in the docking station 115 will be described with reference to FIG. 5. FIG. 5 is a flowchart showing an example of the operation of the radiation image detection unit 100 according to this embodiment. In the first embodiment, the removal of the radiation image detection unit 100 from the docking station 115 is set as a predetermined condition for starting the aforementioned generation of an image for correction. That is, when it is detected that the power reception unit has stopped receiving power from the outside, the obtainment of image signals from the sensor array and the generation of an image for correction are executed in response to the detection.

In step S500, when the radiation image detection unit 100 is held in the docking station 115, the radiation image detection unit 100 starts to receive power from the power supply unit 116. In step S501, the power control unit 212 causes the power supply 111 to start charging by using the power supply from the power supply unit 116. In the radiation image detection unit 100, it is possible to set whether moving image capturing or still image capturing is to be performed. In step S502, the control unit 207 confirms whether the radiation image detection unit 100 has been set to a moving image capturing mode. Note that the charging started in step S501 is controlled separately from this flowchart by the charge/discharge control circuit 503 as described above. Confirmation as to whether the radiation image detection unit 100 has been set to the moving image capturing mode is performed based on information that is set in advance in the storage unit 209. If it is determined in step S502 that the moving image capturing mode has not been set, offset correction processing need not be performed beforehand. Since a high frame rate is not required in the case of the still image capturing mode, the image for offset correction is obtained immediately before or immediately after the radiation imaging. Hence, if it is determined in step S502 that the moving image capturing mode has not been set, this processing ends, and the charging of the battery 110 is continued.

If it is determined in step S502 that the moving image capturing mode has been set, the driving control unit 213 starts the constant temperature drive in step S503. Next, in step S504, the control unit 207 determines whether the radiation image detection unit 100 has been removed from the docking station 115. This determination is performed by the control unit 207 detecting that the power supply from the power supply unit 116 to the wired connector 112 has stopped. Note that the detection of the removal of the radiation image detection unit 100 from the docking station 115 may be performed by arranging a dedicated detection mechanism (for example, a mechanical switch or the like). If it is determined in step S504 that the radiation image detection unit 100 has been removed from the docking station 115, the control unit 207 confirms in step S505 whether the charge amount of the battery 110 is a charge amount in which moving image capturing can be performed. If it is determined that the charge amount is a charge amount in which moving image capturing can be performed, the control unit 207 generates, in step S506, an image for fixed offset correction. On the other hand, if it is determined in step S505 that the charge amount is not a charge amount in which moving image capturing can be performed, it is a state in which moving image capturing cannot be performed, and the control unit 207 does not generate the image for fixed offset correction in order to suppress battery consumption.

The image for fixed offset correction is obtained by averaging a plurality of sets of radiation image data (that is, dark images) that are read out from the radiation detection unit 107 in a state in which radiation irradiation is not performed to the radiation image detection unit 100. By obtaining the image for fixed offset correction in advance and storing the obtained image in the storage unit 209, high-speed moving image obtainment is possible because an offset image need not be obtained at the time of moving image capturing. The image for fixed offset correction is obtained for all of the moving-image capturing modes held by the radiation image detection unit 100.

Note that although the setting of the moving image capturing mode is confirmed in the storage unit 209 in the above-described first embodiment, the present invention is not limited to this. For example, a switch may be arranged on the radiation image detection unit 100, and determination of the moving image capturing mode may be performed by the state of this switch.

Although the charge/discharge control circuit 503 stops supplying a current to the battery 110 during the obtainment of the image for fixed offset correction in the first embodiment, the present invention is not limited to this so long as an effect of charge current on the image for fixed offset correction can be prevented. For example, in an arrangement in which the power supply path of the radiation detection unit 107 and the power supply path of the charge/discharge control circuit 503 are separated by having a plurality of power supply paths, such as that shown in FIG. 4, current supply to the battery 110 may be continued during the obtainment of the image for fixed offset correction.

As described above, according to the first embodiment, it is possible to make the temperature constant in the apparatus since the constant temperature drive will be executed when the radiation image detection unit 100 is held in the docking station 115. Also, when the radiation image detection unit 100 is removed from the docking station 115, the generation of an image for fixed offset correction is performed immediately. Therefore, it is possible to reduce the wait time from the removal of the radiation image detection unit 100 from the docking station 115 until a radiation image is obtained, and image capturing can be started smoothly. In addition, if the charge amount of the battery 110 has not reached a charge amount in which imaging can be performed, the image for fixed offset correction is not generated since imaging cannot be performed. As a result, more than necessary consumption of the power of the battery 110 is prevented.

Second Embodiment

In the first embodiment, the removal of the radiation image detection unit 100 from the docking station 115 was used as a trigger for the start of the generation of the image for fixed offset correction. The second embodiment will describe an arrangement in which a radiation image detection unit 100 determines whether to generate an image for fixed offset correction based on the charge amount of a battery 110. That is, in the second embodiment, control is performed to execute the generation of an image for correction when the charge amount of the battery 110 has reached a charge amount in which radiation moving image capturing is executable after power reception by a power reception unit has started, and not to execute the generation of the image for correction when the charge amount has not been reached. That is, in the second embodiment, when the radiation image detection unit 100 is held in a docking station 115 which serves a holder, an obtaining unit of the radiation image detection unit 100 obtains image signals to generate the image for correction. Note that the arrangement of a radiation imaging system, the radiation image detection unit 100, and a power supply 111 is the same as that in the first embodiment (FIGS. 1, 2, 3, and 4).

Figure 6:
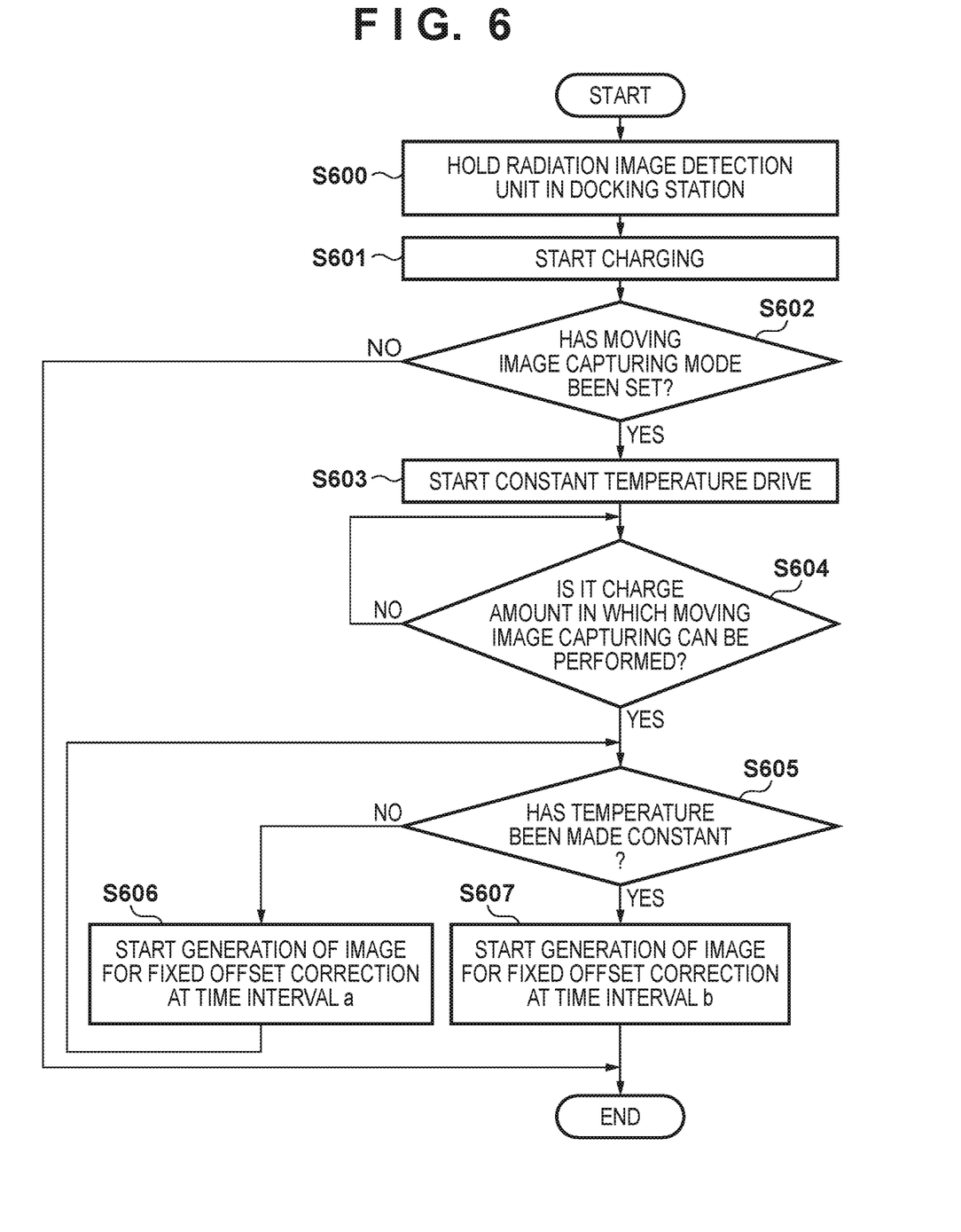
FIG. 6 is a flowchart showing obtainment processing of an image for correction according to the second embodiment.

FIG. 6 is a flowchart showing an example of the operation of the radiation image detection unit 100 according to the second embodiment. In step S600, when the radiation image detection unit 100 is held in the docking station 115, the radiation image detection unit 100 starts receiving power from the power supply unit 116. In step S601, a power control unit 212 causes the power supply 111 to start charging by using the power supply from the power supply unit 116. In step S602, a control unit 207 confirms whether the radiation image detection unit 100 is set to a moving image capturing mode. If it is determined in step S602 that the moving image capturing mode has been set, a driving control unit 213 starts the constant temperature drive in step S603. The above-described steps S600 to S603 have the same processes as those in steps S500 to S503 in the first embodiment.

In step S604, the control unit 207 confirms whether the charge amount of the battery 110 is a charge amount in which moving image capturing can be performed. If the charge amount is a charge amount in which moving image capturing can be performed, the control unit 207 starts the generation of the image for fixed offset correction at predetermined time intervals after step S605. Note that the control unit 207 changes the predetermined time intervals in the generation of the image for correction based on the temperature or its estimated values in the apparatus that has been constant by the constant temperature drive. In step S605, it is confirmed whether the radiation image detection unit 100 has been set to a state in which the temperature has been constant by the constant temperature drive started in step S603. Whether the radiation image detection unit has changed to a state in which the temperature has been constant is confirmed by, for example, the elapse of time since the start of the constant temperature drive. For example, the required time until the temperature is constant by the constant temperature drive is stored in a storage unit 209, and a state in which the temperature has been constant is determined when the time elapsed from the start of the constant temperature drive has exceeded the stored required time. The control unit 207 activates a timer together with the start of the constant temperature drive and compares the value of the timer and the required time stored in the storage unit 209. When the value of the timer is equal to or more than the required time, it is determined that the temperature has been constant, that is, a state in which the temperature has been constant is determined.

If a state in which the temperature has been constant is not determined in step S605, the control unit 207 generates, in step S606, an image for fixed offset correction at a time interval a. If it is determined in step S605 that the radiation image detection unit has changed to a state in which the temperature has been constant by the constant temperature drive, the control unit 207 changes, in step S607, the generation timing of the image for fixed offset correction to a time interval b (b>a). Before the temperature is made into a constant state by the constant temperature drive, temperature change due to the elapse of time can occur, and the influence of the dark-current change caused by the temperature is large. Hence, the generation of the image for fixed offset correction needs to be performed at shorter intervals than in a state in which the temperature has been constant. That is, the time interval for the generation of the image for fixed offset correction is set longer after the internal temperature of the radiation imaging apparatus has been constant than before the internal temperature has been constant.

Note that although two types of generation timings were set for the image for fixed offset correction in the second embodiment, the present invention is not limited to this. Three or more types of intervals may be set. For example, from the gradient relationship between the temperature and the temperature during the constant temperature drive, the generation timings may be set finely in accordance with the elapse of time. Also, while obtaining an image for fixed offset correction, a charge/discharge control circuit 503 stops the current supply to the battery 110 to prevent the charge current from influencing the image for fixed offset correction. However, in a case in which the power supply for charging the battery 110 and the power supply for the arrangement to obtain an image signal are arranged as separate systems, as shown in FIG. 4, the charging may be continued.

Also, in the second embodiment, although the determination as to whether the temperature is in a constant state is performed based on the elapse of time since the start of the constant temperature drive (temperature estimation by execution time of constant temperature drive), the present invention is not limited to this. For example, a temperature sensor may be provided in the radiation image detection unit 100, and the control unit 207 may monitor the temperature information of the temperature sensor to make a determination.

As described above, according to the second embodiment, the image for fixed offset correction, which serves as an image for correction that is used for imaging, is obtained while the radiation image detection unit 100 is held in the docking station 115. In addition, even when it is before the temperature of the radiation image detection unit 100 changes to a constant state, a suitable image for fixed offset correction can be obtained by changing the generation timing of the image for fixed offset correction. Therefore, the user can immediately perform imaging after the radiation image detection unit 100 is removed from the docking station 115.

Third Embodiment

In the third embodiment, the generation of an image for fixed offset correction, which is an image for correction for moving image capturing, is started by setting, as a trigger, the fact that the time until charge completion has become shorter than the time until the temperature is made into a constant state by the constant temperature drive. Note that the arrangement of a radiation imaging system, a radiation image detection unit 100, and a power supply 111 according to the third embodiment is the same as that in the first embodiment (FIGS. 1, 2, 3, and 4).

Figure 7:
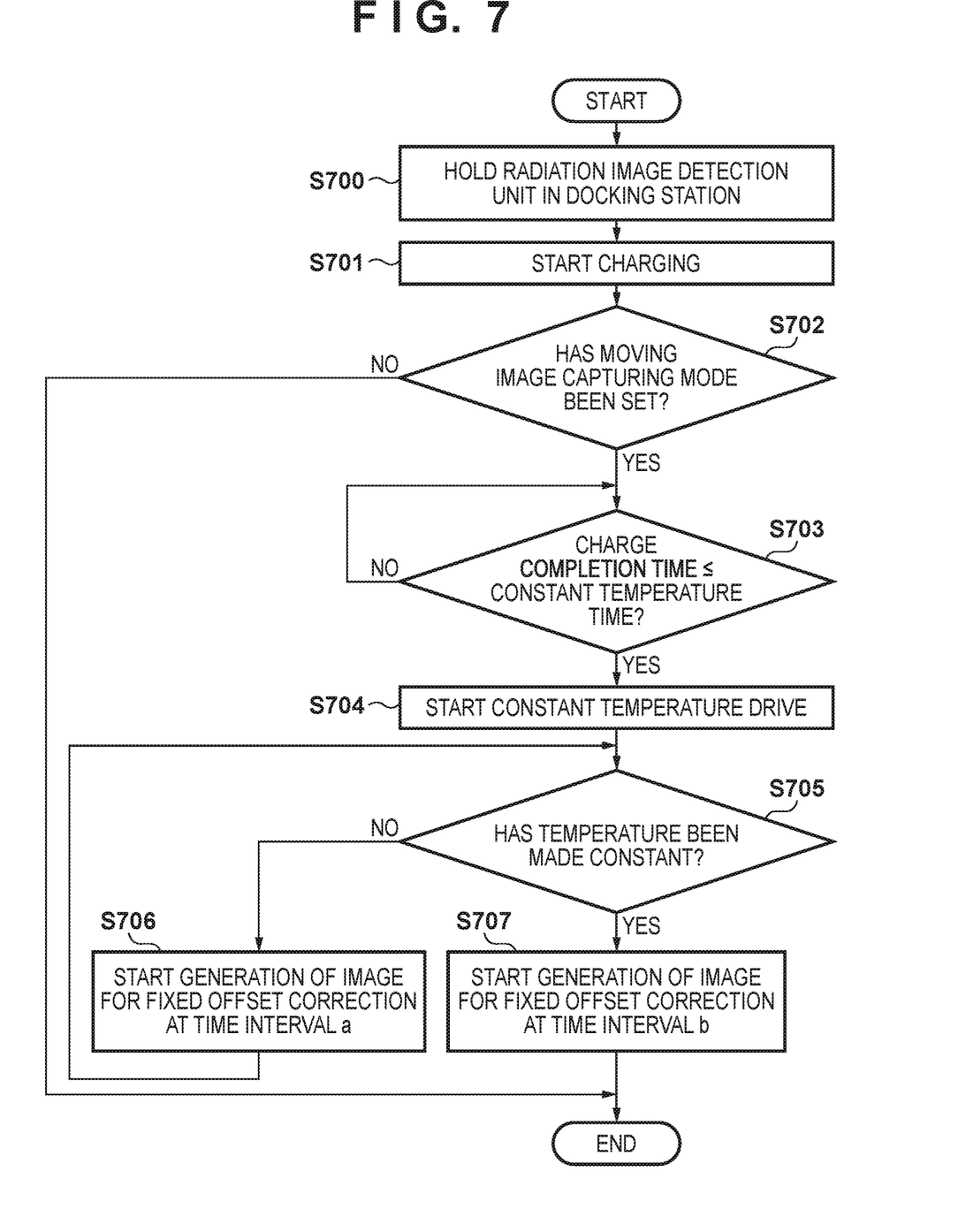
FIG. 7 is a flowchart showing obtainment processing of an image for correction according to the third embodiment.

FIG. 7 is a flowchart showing an example of the operation of the radiation image detection unit 100 according to the third embodiment. In step S700, when the radiation image detection unit 100 is held in a docking station 115, the radiation image detection unit 100 starts receiving power from a power supply unit 116. In step S701, a power control unit 212 causes the power supply 111 to start charging by using the power supply from the power supply unit 116. In step S702, a control unit 207 confirms whether the radiation image detection unit 100 is set to a moving image capturing mode. The above-described steps have the same processes as those of steps S500 to S502 in the first embodiment.

If it is determined in step S702 that the moving image capturing mode has been set, the process advances to step S703. In step S703, the control unit 207 compares the time (charge completion time) at which charging is to be completed in a battery 110 and the time (constant temperature time) until the temperature of the radiation image detection unit 100 will be made into a constant state by the constant temperature drive. Note that the calculation of the charge completion time is, for example, performed in the following manner. That is, the control unit 207 calculates the remaining charge amount of the battery 110 based on the voltage value and the current value of the battery 110 measured by a charge/discharge control circuit 503 and estimates, from the remaining charge amount, the time required to fully charge the battery. The constant temperature time by the constant temperature drive is obtained in the following manner. That is, the time required for the temperature to be constant by the constant temperature drive is measured in advance, and the control unit 207 obtains the constant temperature time by subtracting, from the time stored in a storage unit 209, the time since the constant temperature drive has started.

In step S703, if it is determined that the constant temperature time is equal to or more than the charge completion time, the control unit 207 starts, in step S704, the constant temperature drive by using a driving control unit 213. Next, in step S705, the radiation image detection unit 100 confirms whether the temperature is in a constant state. This confirmation is the same as that performed in step S605 in the second embodiment. The processes of subsequent steps S706 and S707 are the same as those of steps S606 and S607 in the second embodiment. That is, if it is determined in step S705 that the temperature has not been constant, the image for fixed offset correction is generated, in step S706, at a time interval a. If it is determined in step S705 that temperature has been constant by the constant temperature drive, the generation timing of the image for fixed offset correction is changed, in step S707, to a time interval b (b>a).

Note that although the time until the battery 110 is fully charged is set as the charge completion time the above-described embodiment, the present invention is not limited to this. For example, a value smaller than a full charge amount may be set, such as the minimum charge amount necessary to capture a moving image. While obtaining the image for fixed offset correction, the charge/discharge control circuit 503 stops the current supply to the battery 110 to prevent the charge current from influencing the image for fixed offset correction. However, in a case in which the power supply for charging the battery 110 and the power supply for the arrangement to obtain an image signal are arranged as separate systems, as shown in FIG. 4, the charging may be continued.

As described above, according to the third embodiment, when the radiation image detection unit 100 is held in the docking station 115, the constant temperature time and the charge completion time are compared, and if the charge completion time is longer, the generation of an image for correction is not executed. Therefore, the constant temperature drive can be suppressed to the minimum time, and power saving is possible.

Note that although the constant temperature drive and the generation of the image for fixed offset correction are separated in the first to third embodiments, the generation of the image for fixed offset correction may be performed instead of the constant temperature drive. That is, it may be set so that a dark image is obtained in the drive for the constant temperature drive to generate the image for fixed offset correction. Additionally, although the constant temperature drive is driven by a signal obtainment circuit 202 in the second and third embodiments, the present invention is not limited to this. The temperature in the apparatus may be constant by repetitively driving another predetermined circuit (for example, a circuit that generates heat by the driving operation).

Furthermore, although the above-described embodiments described processing until the generation of the image for offset correction for moving image capturing, processing until the generation of the image for offset correction for still image capturing may be adopted.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-074027, filed Apr. 3, 2017, which is hereby incorporated by reference herein in its entirety.

What is claimed is:

1. A radiation imaging apparatus that generates an image by receiving radiation transmitted through an object, comprising:
    a sensor array configured to detect radiation;
    an obtaining unit configured to obtain an image signal from a detection signal of the sensor array;
    a power reception unit configured to receive power supplied from outside;
    a battery that is charged using the power received by the power reception unit; and
    a generating unit configured to generate an image for correction by obtaining the image signal by the obtaining unit in response to detection that the power reception unit has stopped receiving the power.

2. The apparatus according to claim 1, wherein the image for correction is an image for fixed offset correction obtained in advance of moving image capturing.

3. The apparatus according to claim 2, wherein the power reception unit receives power from a power supply unit of a holder to hold the radiation imaging apparatus, and
    the generating unit generates the image for correction by obtaining the image signal by the obtaining unit when the radiation imaging apparatus is held in the holder.

4. The apparatus according to claim 2, further comprising a driving unit configured to execute a constant temperature drive that makes the internal temperature of the radiation imaging apparatus constant by repetitively driving a predetermined circuit in response to receiving power in the power reception unit.

5. The apparatus according to claim 2, further comprising:
    a driving unit configured to execute a constant temperature drive that makes the internal temperature of the radiation imaging apparatus constant by repetitively driving a predetermined circuit in response to receiving power in the power reception unit, wherein
    the generating unit starts generating the image for correction by obtaining the image signal by the obtaining unit at a predetermined time interval in response to a time required for making the constant temperature by the driving unit becoming the same or longer compared to a time required to complete charging of the battery.

6. The apparatus according to claim 2, wherein the charging of the battery is stopped while the obtaining unit is obtaining the detection signal of the sensor array to obtain the image for correction by the generating unit.

7. The apparatus according to claim 2, wherein the power reception unit receives a first power supply for charging the battery and a second power supply which is supplied to the sensor array and the obtaining unit, and
    the charging of the battery using the first power is continued while the obtaining unit obtains the detection signal of the sensor array to obtain the image for correction by the generating unit.

8. The apparatus according to claim 2, wherein the generating unit obtains a plurality of dark images based on the image signals that are read out from the sensor array in a state in which radiation irradiation is riot performed and generates the image for correction by averaging the plurality of dark images.

9. A radiation imaging apparatus that generates an image by receiving radiation transmitted through an object, comprising:
    a sensor array configured to detect radiation;
    an obtaining unit configured to obtain an image signal from a detection signal of the sensor array;
    a power reception unit configured to receive power supplied from outside;
    a battery that is charged using the power received by the power reception unit; and
    a generating unit configured to generate an image for correction when a charge amount of the battery has reached a charge amount in which radiation moving image capturing can be executed, and configured not to generate the image for correction when the charge amount of the battery has not reached the charge amount in which radiation moving image capturing can be executed.

10. A radiation imaging apparatus that generates an image by receiving radiation transmitted through an object, comprising:
    a sensor array configured to detect radiation;
    an obtaining unit configured to obtain an image signal from a detection signal of the sensor array;
    a power reception configured to receive power supplied from outside;
    a battery that is charged using the power received by the power reception unit; and
    a generating unit configured to start generation of an image for correction by obtaining the image signal by the obtaining unit at a predetermined time interval in response to a charge amount of the battery reaching a charge amount in which radiation moving image capturing can be executed.

11. The apparatus according to claim 10, further comprising a driving unit configured to execute a constant temperature drive that makes the internal temperature of the radiation imaging apparatus constant by repetitively driving a predetermined circuit in response to receiving power in the power reception unit.

12. The apparatus according to claim 11, further comprising a changing unit configured to change the predetermined time interval based on a temperature of the apparatus or estimation of the temperature.

13. The apparatus according to claim 12, wherein the changing unit changes the predetermined time interval based on the time from the start of the constant temperature drive.

14. The apparatus according to claim 12, wherein the changing unit sets the predetermined time interval to be longer after the internal temperature of the radiation imaging apparatus has been constant than before the internal temperature of the radiation imaging apparatus has been constant.

15. A radiation imaging apparatus that generates an image by receiving radiation transmitted through an object, comprising:
    a sensor array configured to detect radiation;
    an obtaining unit configured to obtain an image signal from a detection signal of the sensor array;
    a power reception unit configured to receive power supplied from outside;
    a battery that is charged using the power received by the power reception unit;

a generating unit configured to generate an image for correction by obtaining the image signal from the obtaining unit in response to the satisfaction of a predetermined condition after power reception is started by the power reception unit; and a setting unit configured to set whether to perform moving image capturing or still image capturing, wherein the generating unit executes the generation of the image for correction when the moving image capturing is set and does not execute the generation of the image for correction when the still image capturing is set.

16. A control method of a radiation imaging apparatus that generates an image by receiving radiation transmitted through an object, the method comprising:

obtaining an image signal from a detection signal of a sensor array configured to detect radiation;

receiving power supplied from outside;

charging a battery using the received power; and generating an image for correction by obtaining the image signal in response to detection that reception of the power has stopped.

17. A non-transitory computer readable storage medium storing a program for causing a computer to execute a control method of a radiation imaging apparatus that generates an image by receiving the radiation transmitted through an object, the method comprising:

obtaining an image signal from a detection signal of a sensor array configured to detect radiation;

receiving power supplied from outside;

charging a battery using the received power; and generating an image for correction by obtaining the image signal in response to detection that reception of the power has stopped.

* * * * *